United States Patent
Libbey et al.

(10) Patent No.: US 7,055,789 B2
(45) Date of Patent: Jun. 6, 2006

(54) ARTICULATING TOOL ARM WITH POSITIONAL FEEDBACK

(75) Inventors: Lucian Curt Libbey, Cookeville, TN (US); James Phillip Cranford, Cookeville, TN (US); Michael S. Janko, Cookeville, TN (US)

(73) Assignee: Automation Tool Company, Cookeville, TN (US)

( * ) Notice: Subject to any disclaimer, the term of this patent is extended or adjusted under 35 U.S.C. 154(b) by 0 days.

(21) Appl. No.: 10/435,794

(22) Filed: May 12, 2003

(65) Prior Publication Data

US 2004/0026584 A1 Feb. 12, 2004

Related U.S. Application Data

(60) Provisional application No. 60/380,503, filed on May 14, 2002.

(51) Int. Cl.
*E04G 3/00* (2006.01)
*B25B 17/00* (2006.01)
(52) U.S. Cl. .................... 248/278.1; 81/57.4
(58) Field of Classification Search ............. 248/278.1, 248/276.1, 280.11; 414/1, 4, 730; 118/697; 239/69; 81/57.4
See application file for complete search history.

(56) References Cited

U.S. PATENT DOCUMENTS

| | | | | |
|---|---|---|---|---|
| 2,344,108 A | * | 3/1944 | Roselund | 118/323 |
| 3,904,042 A | * | 9/1975 | Colston | 414/1 |
| 3,910,325 A | * | 10/1975 | Dixon | 81/57.37 |
| 4,239,431 A | * | 12/1980 | Davini | 414/1 |
| 4,782,726 A | * | 11/1988 | Ryder et al. | 81/57.4 |
| 4,863,133 A | * | 9/1989 | Bonnell | 248/280.11 |
| 4,881,709 A | * | 11/1989 | Nakamura | 248/281.11 |
| 5,109,736 A | * | 5/1992 | Dixon | 81/57.4 |
| 5,193,963 A | * | 3/1993 | McAffee et al. | 414/5 |
| 5,213,292 A | | 5/1993 | Evans | |
| 5,343,391 A | * | 8/1994 | Mushabac | 433/76 |
| 5,544,554 A | * | 8/1996 | Brightly | 81/57.4 |
| 5,557,450 A | * | 9/1996 | Sun | 359/234 |
| 5,580,021 A | | 12/1996 | Gillanders | |
| 5,597,146 A | * | 1/1997 | Putman | 248/276.1 |
| 5,791,619 A | | 8/1998 | Myers | |
| 6,065,373 A | * | 5/2000 | Watanabe et al. | 81/57.4 |
| 6,324,728 B1 | | 12/2001 | Blankenheim | |
| 6,405,158 B1 | * | 6/2002 | Massie et al. | 703/6 |
| 6,659,939 B1 | * | 12/2003 | Moll et al. | 600/102 |
| 6,711,972 B1 | * | 3/2004 | Joyner et al. | 81/57.4 |
| 6,721,393 B1 | * | 4/2004 | Brauss | 378/71 |

\* cited by examiner

*Primary Examiner*—Anita M. King
(74) *Attorney, Agent, or Firm*—Thomas A. Lennox, Esq.

(57) ABSTRACT

A power hand-tool support apparatus includes a multi-component articulating arm with pneumatic lifting assist to hold the hand-tool and protect the operator from tool induced torque, the apparatus equipped with positional feedback optical encoders, to communicate with a dedicated control unit to define a selectable datum position of the hand-tool in the work-space with a lock-out of the tool if the positions do not comply with programmed tightening sequences on bolt patterns.

39 Claims, 6 Drawing Sheets

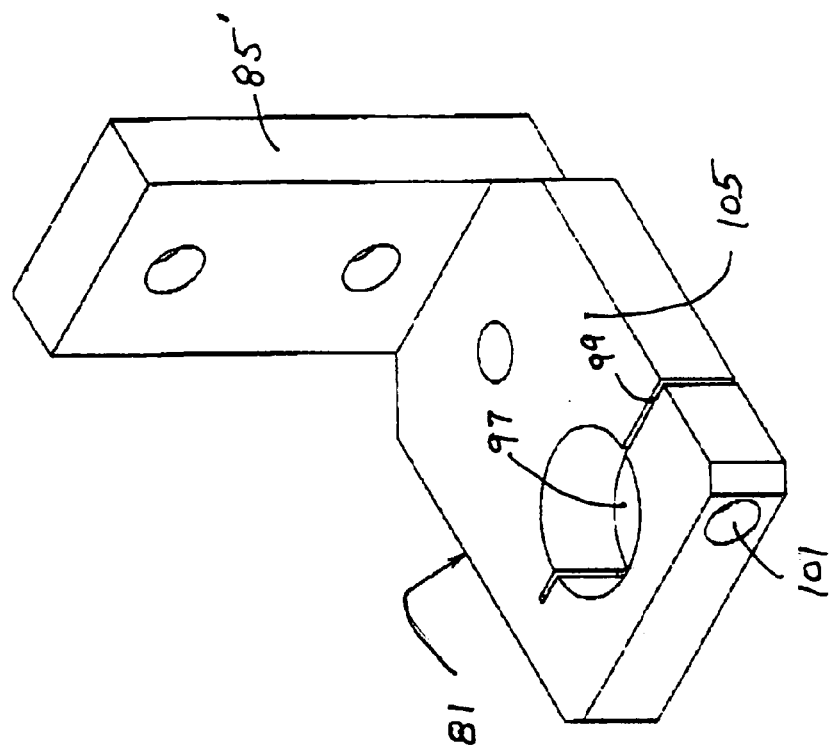
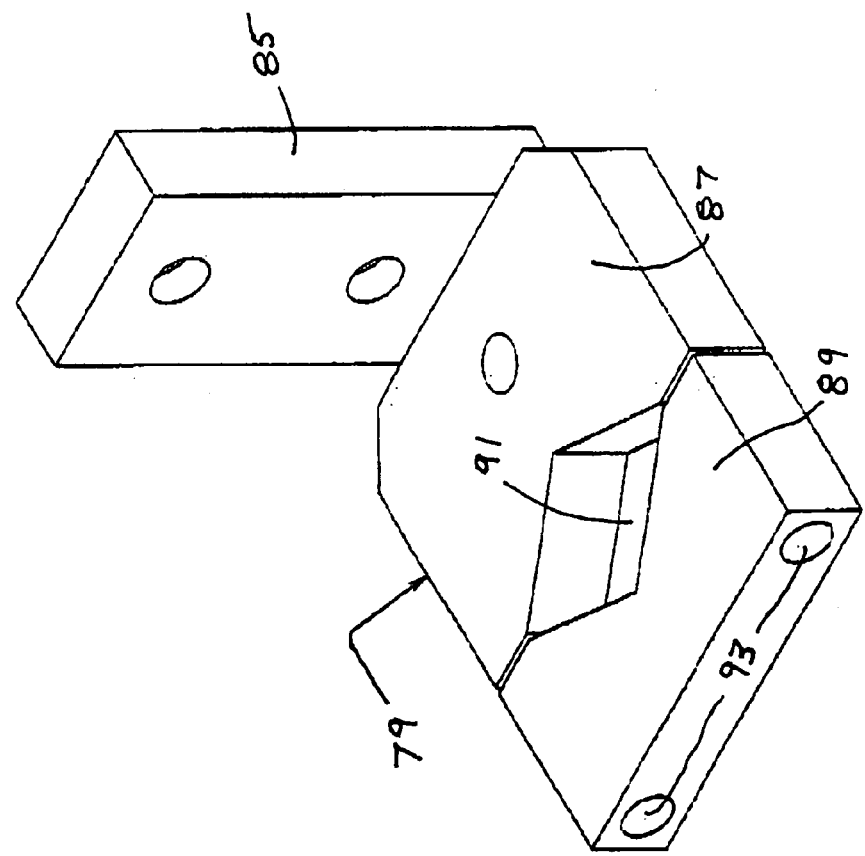

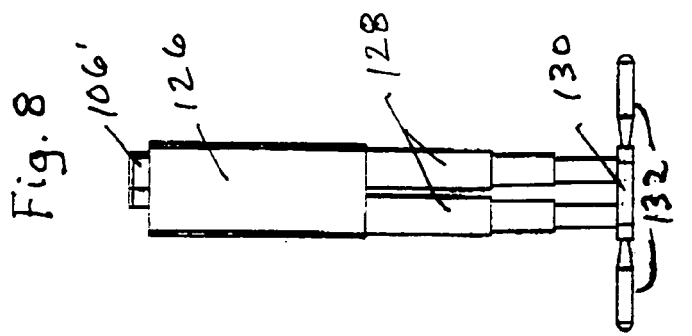
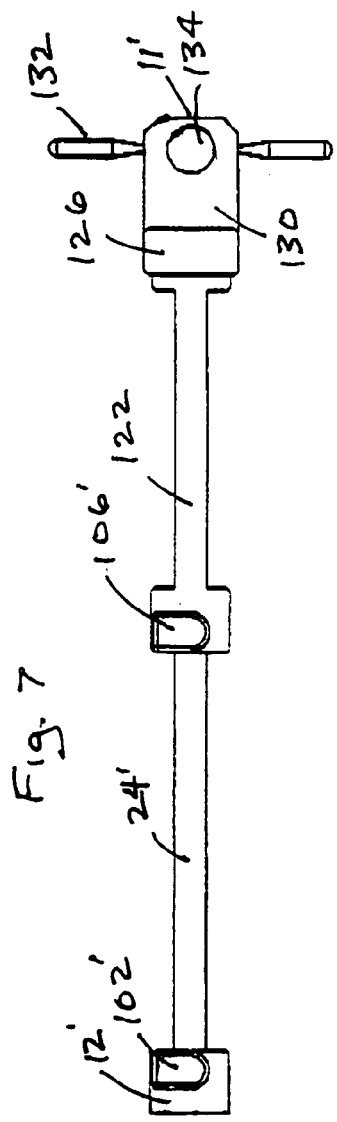
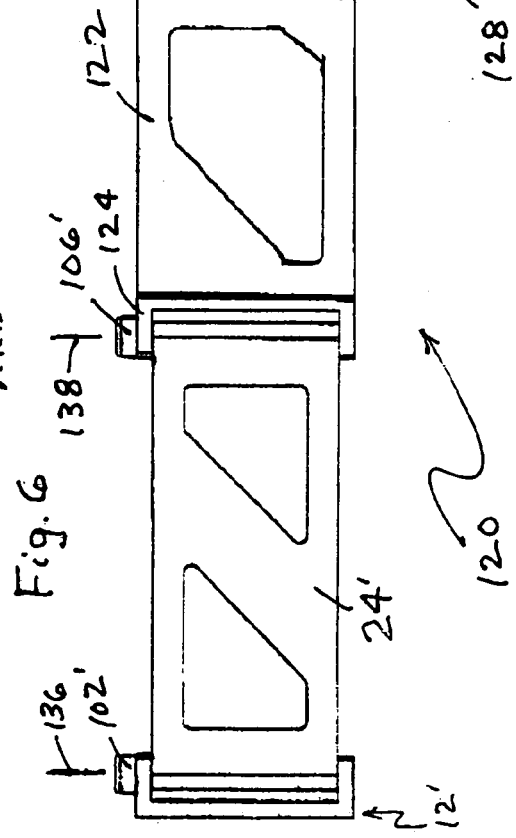

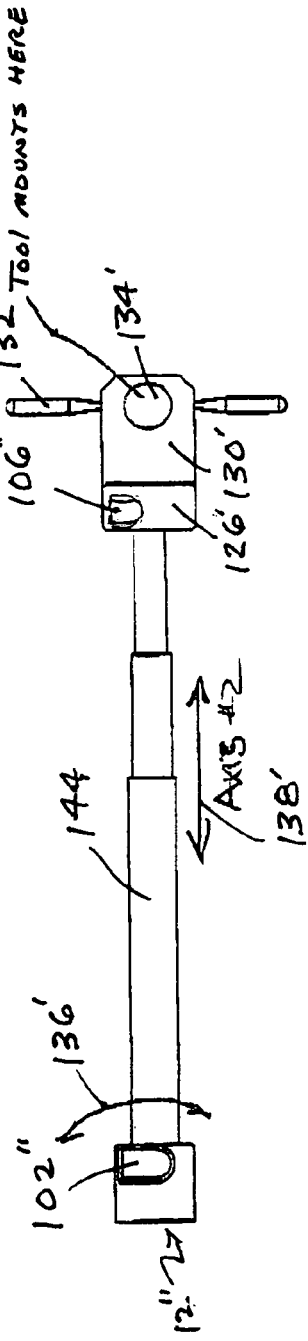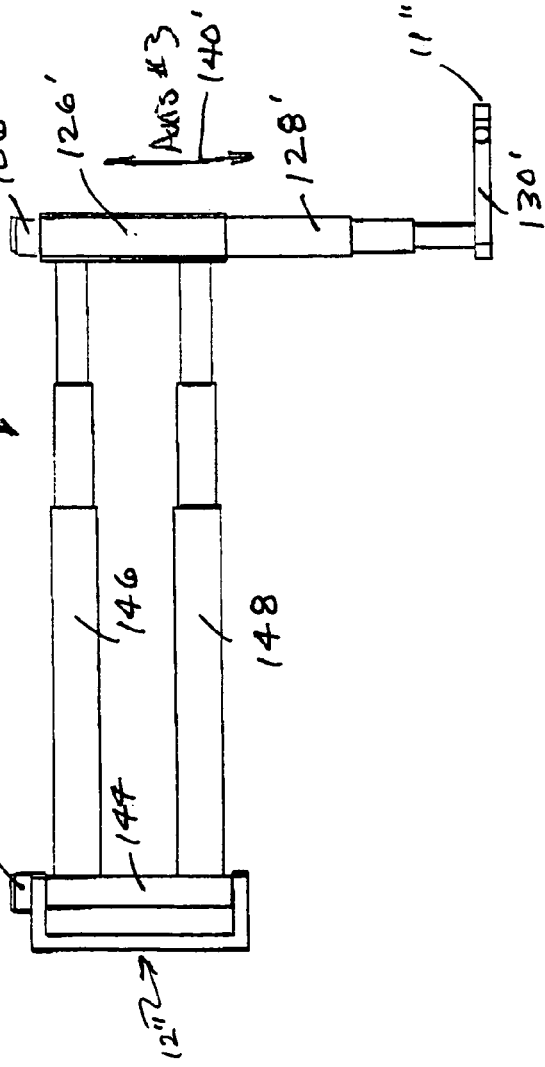

ARTICULATING TOOL ARM WITH POSITIONAL FEEDBACK

This application claims the benefit of U.S. Provisional Application No. 60/380,503, filed May 14, 2002.

FIELD OF THE INVENTION

This invention is directed to an apparatus used at an industrial workstation that includes a hand tool holding device. More particularly the apparatus may include a positional feedback mechanism that provides the tool position and is adapted to be connected to a controlling mechanism and even more particularly may include torque feedback resistance to protect the operator from undue strain and a balancing mechanism to assist lifting the tool.

BACKGROUND OF THE INVENTION

Electric and pneumatic powered hand tools are commonly used on assembly lines and assembly stations in industrial manufacturing settings. These tools include drivers for bolts, nuts, screws and like fasteners. While some manufacturing techniques are adaptable to robotic systems, many utilize an operator wielding a powered hand tool. The assembly of a work piece typically involves numerous steps and includes a multiplicity of riveting, threading, and tightening various types of fasteners usually in a particular order and in a three dimensional space around the work piece. Thus it is not uncommon for dozens of differing types and sizes of fasteners to be installed on a particular job with the requirements that the installation and tightening of the fasteners must be in certain prescribed order, or else the stress placed on the parts by tightening a fastener out of order might induce a crack or other failure. Rigorous training is required to attempt to control the operator and reduce the chance of error. However, mistakes occur resulting in breakage during manufacture or later failure due to stresses placed in the part by incorrect installation during manufacture. The prior art has failed to successfully address these problems.

Optical encoder devices that digitally measure an angular position have been used in industrial manufacturing applications, most notably in robotic controlled and operated systems. However, these devices have not been used to attain the objects described herein below and in the present invention.

Present power tool balancers and anti-torque tool holding devices have inadequate balance control effectiveness and allow substantial torque feed back to the operator when the tool is in some positions. For example, when the tool is supported on an arm that includes a plurality of universal joints, each of which allows rotational movement in one plane, alignment of the torque at certain angles with these planes can result in some torque feedback to the operator. Spring loaded balance mechanisms are commonly used tool suspension apparatuses, but these are difficult to control and adjust to changing conditions such as the weight of the tool and individual operator preferences. Some operators prefer that the system require some lifting of the hand-tool and others prefer that some pulling down of the tool against the spring tension be required for operation. Since operators change at the end of shifts and sometimes during the shifts, adjustment is cumbersome, at best time consuming and may not be available at all.

U.S. Pat. No. 5,791,619 to Myers discloses an anti-torque tool suspension arm using a splined axially extensive arm in and axially extensive housing cavity with a splined hub insert to "largely eliminate play between the rod and housing". U.S. Pat. No. 6,054,373 to Watanabe, et al. discloses a power tool holding assembly that includes piston-cylinder linear movement guiding unit with a ball spline with a piston rod. U.S. Pat. No. 5,213,292 to Evans discloses a tool balance using springs. U.S. Pat. No. 5,580,021 to Gillanders discloses a suspension mechanism for a hand-manipulated power-tool wherein the suspension tension is relieved when the tool is actuated. U.S. Pat. No. 5,109,736 to Dixon discloses power screwdriver on a cantilevered support movable on a worktable with power assist up and down. U.S. Pat. No. 5,544,554 to Brightly discloses a pneumatic torque wrench mounted on a torque arm, which is locked in place when the wrench is engaged allowing the operator to remove hands when the torque is applied. U.S. Pat. No. 6,324,728 to Blankenheim discloses an ergonomic attachment for inline power tools that includes an inverted U-shaped member that is forced downwardly on the forearm of the operator.

None of these devices satisfy the needs addressed herein and satisfy the objects of this invention.

SUMMARY OF INVENTION

It is an object of an embodiment of the present invention to provide a device, including those described herein above and below that will support and hold a powered hand-tool that can be freely moved throughout a three-dimensional workspace.

It is a further object of an embodiment of the present invention to provide an articulated arm device, including those described herein above and below, that will support and hold a powered hand-tool, which un-checked will induce torque to the operator, and that by its strategically positioned joints counter any torque-induced rotation of the tool and thus avoid transfer of the torque to the operator.

It is an additional object of an embodiment of the present invention to provide a device, including those described herein above and below, that controls the order and location of a series of operations using the hand-tool through feedback to the operator if an operation is in the wrong location or out of order.

It is a further object of an embodiment of the present invention to provide a device, including those described herein above and below, that with a plurality of optical encoder devices, which measure and communicate the angular position of the encoder device, the devices being placed at locations along an articulated arm holding a hand-tool provide the means to establish the position of the hand-tool relative to a selectable datum position.

It is an additional object of an embodiment of the present invention to provide a device, including those described herein above and below that allows electrical connection to digital-to-analog converter for signal conversion to a scaled voltage signal, which is then communicated to a controlling means that can calculate and establish the position in a three-dimensional workspace.

It is a further object of an embodiment of the present invention to provide a device, including those described herein above and below, that is capable of alerting the operator and even electrically latching the tool on the mounting arm by turning it off should the operator attempt to install a fastener in a wrong place or at a wrong time in a programmed order sequence.

It is an additional object of an embodiment of the present invention to provide a device, including those described herein above and below, that provides a weight balancing means with a pneumatic cylinder connected to the articulated arm, wherein the pressure is adjustable to compensate for varying tool weights and operator preferences.

An embodiment of this invention is a hand-tool support apparatus adapted to support the hand-tool and allow an operator to move the hand-tool to a multiplicity of chosen locations in a three-dimensional space. The apparatus includes a multi-component articulating arm, including a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space. The apparatus further includes at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool. The three positional feedback means are adapted to be connected to an electrical controlling means to receive the angular positions of the positional feedback means and correlate the positions.

The following are preferred embodiments that may be included in any other embodiment. It is preferred that there be three positional feedback means and at least one of the three positional feedback means be an optical encoder to digitally measure a position of a component of the arm. It is further preferred that all of positional feedback means be optical encoders. It is also preferred that the controlling means further include an apparatus chosen from the group consisting of a computer, a dedicated control board, and an industrial programmable logic controller and said apparatus is capable of receiving signals from said positional feedback means and processing the signals through a conventional program to compute the angular position of each positional feedback means relative to a predefined datum, or start point, thereby establishing a position in the space. It is further preferred that the controlling means further include means to electrically and pneumatically control the distal end of the arm, said control being established by means of a user-defined set of programmable parameters, and display means to graphically instruct the user for tool set-up and in-process parameters feedback during tool use. It is also preferred that the apparatus further include latching means to electrically lock the tool upon receiving a signal from the controlling means that the position of the hand-tool is in an incorrect position in the space. It is further preferred that the hand-tool be a power hand-tool capable of transmitting a torque-induced rotation to the operator and the arm further include a first guiding means allowing a proximal section of the arm to articulate only in a single first direction, a second guiding means allowing a second section of the arm coupled to the proximal section to articulate only in a single second direction normal with first direction, and a third guiding means allowing the distal end of the arm to articulate only in a single third direction at an angle with a plane or the first and second directions. It is also preferred that there be three positional feedback means and each of said means are positioned along the arm to measure a position of each of the three sections. It is further preferred that the apparatus further include a weight countering means to counter the weight of the arm and hand-tool, the means comprising a pneumatic cylinder comprising clevis ends connected to proximal and distal ends of a section of the arm moving in a vertical direction, whereas the pneumatic cylinder is adapted to be fluid connectable to a pressurized fluid source. It is also preferred that apparatus further include pressure adjustment means in the pneumatic cylinder allowing adjustment of the pressure in the cylinder to compensate for varying tool weights and operator preference. It is further preferred that apparatus further include a tool mounting device comprising a primary V-block member rigidly attached to the distal end of the arm, a detachable opposing V-block, and clamping means comprising threaded fasteners to attach the detachable V-block to the primary V-block and exert clamping pressure on the detachable V-block adapted to retain a hand-tool between the V-blocks. It is also preferred that the third guiding means include a plurality of rotateably mounted support members in a vertically disposed parallelogram alignment allowing the distal end of the arm to articulate only in a vertical direction. It is further preferred that the arm include a first arm section comprising a proximal end rotateably connected to a mounting means adapted to be connectable to the external support and distal end to which is rotateably connected to a proximal end of a second arm section comprising a distal end attached to connection means connecting to a tool mounting means to detachably hold the hand-tool. It is also preferred that the arm further include at least one linear telescoping guide rod section that does not protrude behind a proximal end of the section when fully retracted and maintain the distal end in linear orientation throughout its movement. It is further preferred that the third section of the arm include a pair of the linear telescoping guide rods rigidly attached at the distal end of the second section of the arm in a vertically aligned parallelogram arrangement to maintain the distal end of the arm in a vertical orientation throughout movement in a vertical axis. It is also preferred that apparatus further include a weight countering means to counter the weight of the arm and the hand-tool, the means including a pneumatic cylinder comprising clevis ends connected to proximal and distal ends of a section of the arm moving in a vertical plane, whereas the pneumatic cylinder is adapted to be fluid connectable to a pressurized fluid source. It is further preferred that each of the positional feedback means be further adapted to be electrically connected to separate digital-to-analog converter modules for signal conversion to a scaled voltage, said voltage signal then communicated to said controlling means. It is also preferred that the controlling means further include an apparatus chosen from the group consisting of a computer, a dedicated control board, and an industrial programmable logic controller and said apparatus is capable of receiving said signals from said converter modules and processing the signals through a conventional program to compute the angular position of each three positional feedback means relative to a predefined datum, or start point, thereby establishing a position in the space. It is further preferred that the controlling means further include means to electrically and pneumatically control the distal end of the arm, said control being established by means of a user-defined set of programmable parameters, and display means to graphically instruct the user for tool set-up and in-process parameters feedback during tool use.

A second embodiment of the invention is a power hand-tool support apparatus adapted to support the hand-tool and allow an operator to move the hand-tool to a multiplicity of chosen locations in a three-dimensional space. The apparatus includes a multi-component articulating arm that includes a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space. As the power hand-tool is capable of transmitting a torque-induced rotation to the operator and the arm further includes a first guiding means allowing a proximal section of the arm to articulate only in a single first direction, a second guiding means allowing a second section of the arm coupled to the proximal section to articulate only in a single second direction normal with first direction, and a third guiding means allowing the distal end of the arm to articulate only in a single third direction at an angle with a plane or the first and second directions. The apparatus further includes at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool. At least one of the three positional feedback means is an optical encoder to digitally measure a position of a section of the arm and the positional feedback means are adapted to be connected to an electrical controlling means to receive the angular positions of the encoder means and record the positions.

A third embodiment of the invention is power hand-tool support apparatus adapted to support the hand-tool that is capable of transmitting a torque-induced rotation to the operator, the apparatus comprising a multi-component articulating arm capable of allowing the operator to move the hand-tool to the locations in a work space. The arm includes a length with a proximal end adapted to be structurally attached to an external support and a distal end adapted to be detachably attached to the hand-tool, and at least one linear telescoping guide rod section that does not protrude behind a proximal end of the section when fully retracted and maintain the distal end in linear orientation throughout its movement. It is preferred that a third section of the arm include a pair of the linear telescoping guide rods rigidly attached at a distal end of a second section of the arm, the rods in a vertically aligned parallelogram arrangement to maintain a distal end of the arm in a vertical orientation throughout movement in a vertical axis. It further preferred that the apparatus further include a weight countering means to vertically counter the weight of the arm and the hand-tool, the means comprising a pneumatic cylinder comprising clevis ends connected to proximal and distal ends of the third section of the arm moving in a vertical plane, whereas the pneumatic cylinder is adapted to be fluid connectable to a pressurized fluid source. It is also preferred that the arm further include a first guiding means allowing the arm to articulate only in a single first direction and the second guiding means allowing the arm to articulate only in a single second direction in a plane with first direction.

A fourth embodiment of the invention is power hand-tool support apparatus adapted to support the hand-tool that is capable of transmitting a torque-induced rotation to the operator. The apparatus includes a multi-component articulating arm capable of allowing the operator to move the hand-tool to the locations in a work-space. The arm includes a length with a proximal end adapted to be structurally attached to an external support and a distal end adapted to be detachably attached to the hand-tool, and a first guiding means proximate the proximal end connecting to and allowing a first section of the arm to move only in a horizontal arc, a second guiding means connecting a proximal end of a second section of the arm to a distal end of the first section of the arm and allowing the second section of the arm to move only in a second horizontal arc relative to the distal end of the first section and in a plane with the first horizontal arc, and a third guiding means allowing the distal end of the arm to move only in a vertical line relative to a distal end of the second section.

A fifth embodiment of the invention is a power hand-tool support apparatus adapted to support the hand-tool that is capable of transmitting a torque-induced rotation to the operator. The apparatus includes a multi-component articulating arm capable of allowing the operator to move the hand-tool to the locations in a work space. The arm includes a length with a proximal end adapted to be structurally attached to an external support and a distal end adapted to be detachably attached to the hand-tool, and a first guiding means proximate the proximal end of the arm connecting to a proximal end of a horizontally disposed first section of the arm and allowing the first section to move only in a horizontal arc, a second guiding means integral with the first section of the arm allowing a distal end of the first section of the arm to move only in a straight line normal to the proximal end of the first section and in a plane with the horizontal arc, a vertically disposed second section of the arm comprising a proximal end rigidly connected to the distal end to the first section and a free end being the distal end of the arm, and a third guiding means integral with the second section of the arm allowing the distal end of the arm to move only in a vertical line.

BRIEF DESCRIPTION OF THE DRAWINGS

FIG. 4 is a front right side perspective view of a tool holder the may be used on said apparatus.

FIG. 5 is a front right side perspective view of a second tool holder the may be used on said apparatus.

FIG. 6 is a left side elevational view of a second embodiment apparatus of the present invention.

FIG. 7 is a top elevational view of said apparatus.

FIG. 8 is front elevational view of said apparatus as well as the apparatus pictured in FIGS. 9 & 10, although all the part numbers do not correspond with those for the apparatus of FIGS. 9 & 10.

FIG. 9 is a left side elevational view of a third embodiment apparatus of the present invention.

FIG. 10 is a top elevational view of said apparatus.

DESCRIPTION OF PREFERRED EMBODIMENTS

Figure 1:
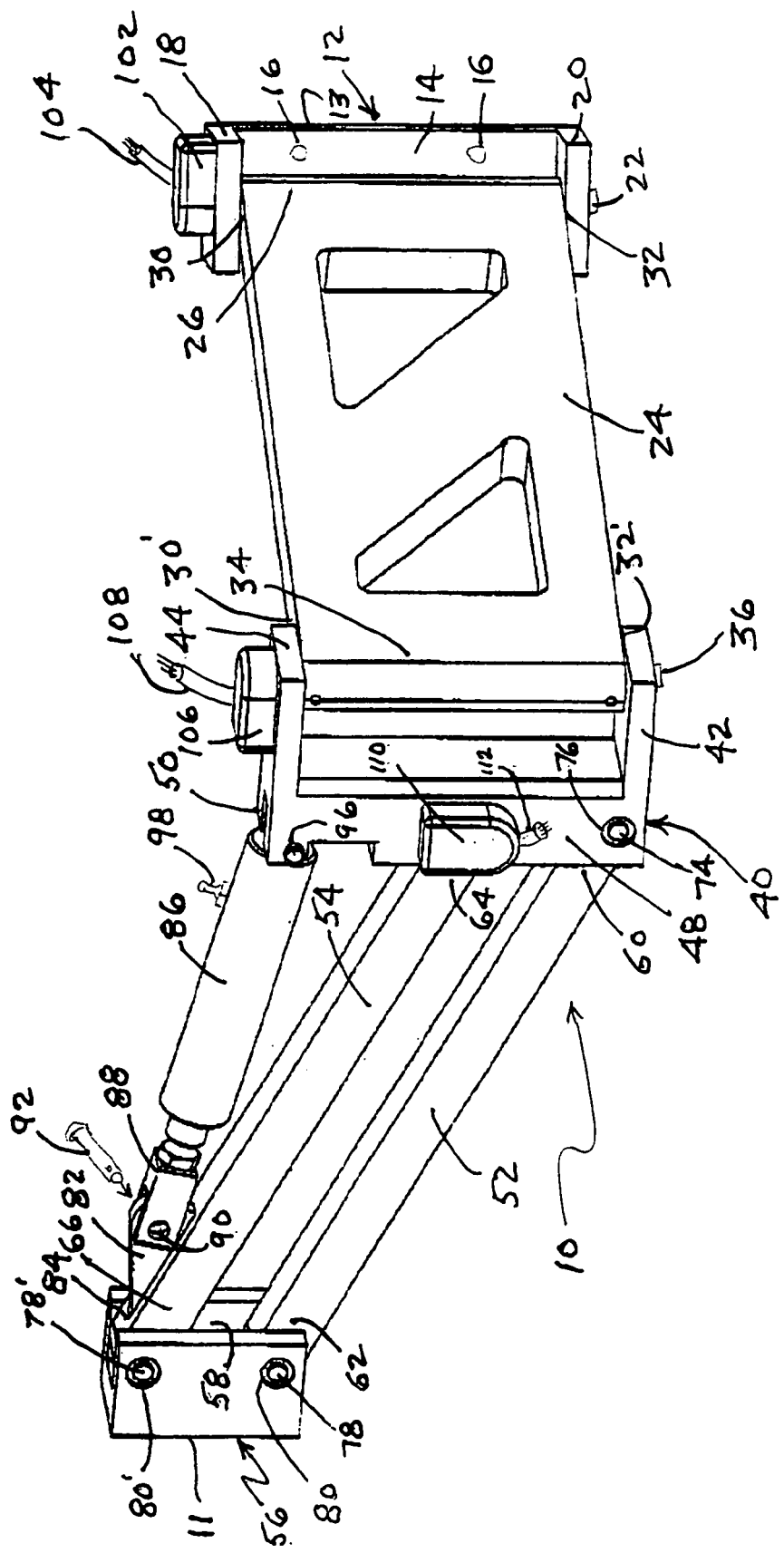
FIG. 1 is a front right side perspective view of an apparatus of the present invention.

A apparatus is provided for use in industrial applications where a heavy tool such as an electric screwdriver or pop-riveting gun will be used by a person in an assembly operation. The apparatus combines the function of a standard tool balancing arm used throughout the industry with the ability to monitor its position in three-dimensional space with the use of optical encoders at revolute joints on each axis of movement on the arm. This positional feedback is then transmitted to either: a) the customer's logic controller, or b) to an integral control unit. In either case, the specific parameters required for the application can be set up for monitoring such attributes as point-to-point sequence and location, part tracking, and individual point failure (i.e. screw-driving torque fault). In one embodiment, the apparatus is constructed of high-strength aluminum structural elements anodized for anti-corrosion and aesthetics. Pivot points contain hardened steel bushings and Nylatron washers for smooth articulation and wear reduction. The pivot shafts must be fixed to one arm and floating in the mating arm for accurate position sensing, so press-fit pull dowels that have a pre-machine locating flat are used. The pneumatic assist is a standard stainless steel cylinder with an adjustable pressure regulator that controls the mount of lift on the arm based on tooling weight and operator preference. The rotary optical encoder is housed in aluminum and features a positive finger-latching connector and has a maximum resolution of 4096 pulses per revolution. The encoder's A/B quadrature output is then converted to analog voltage proportional to encoder position using a digital to analog converter. Because the position feedback tool balancer offers a unique output analog voltage for any point in its range of motion, users can set up parameters that can dictate such things as tightening sequences on bolt patterns or the ability to trace a torque failure to a specific screw in a sequence. End of arm mounting depth (i.e. screw-driving operation) can also be tracked to within roughly 0.030 inch accuracy. In a first embodiment, specific software would need to be provided to the user based on their logic controller and HMI application. This software would initially be developed based on the most commonly used and HMI's controllers and could be provided on disc or downloadable through a website. Custom applications could be developed for areas such as nonstandard controller/HMI software configurations and end effector tooling design. In a second embodiment, the encoder feedback would communicate directly with a dedicated control unit, consisting of a custom circuit board controller and a flat panel keypad/display, both housed in a NEMA enclosure. From this unit, all point-to-point parameters would be entered and stored for the application. All attribute verification would be made by this controller independent of any external control source. Such a device could communicate to external machine controllers by way of low voltage discrete signals, or via RS232 serial communication, depending on the user's preference. Once specific locations are "taught", the user can the assign an identification to each location, assign overall or point specific tolerances to that location, and thus control the end effector tooling based on its location. A specific example would be an application where an operator is installing multiple screws with variable torque readings based on differing materials, screw length, etc. This tracking ability would enable the user to correspond specific torque readings to a given screw based on its location.

Figure 2:
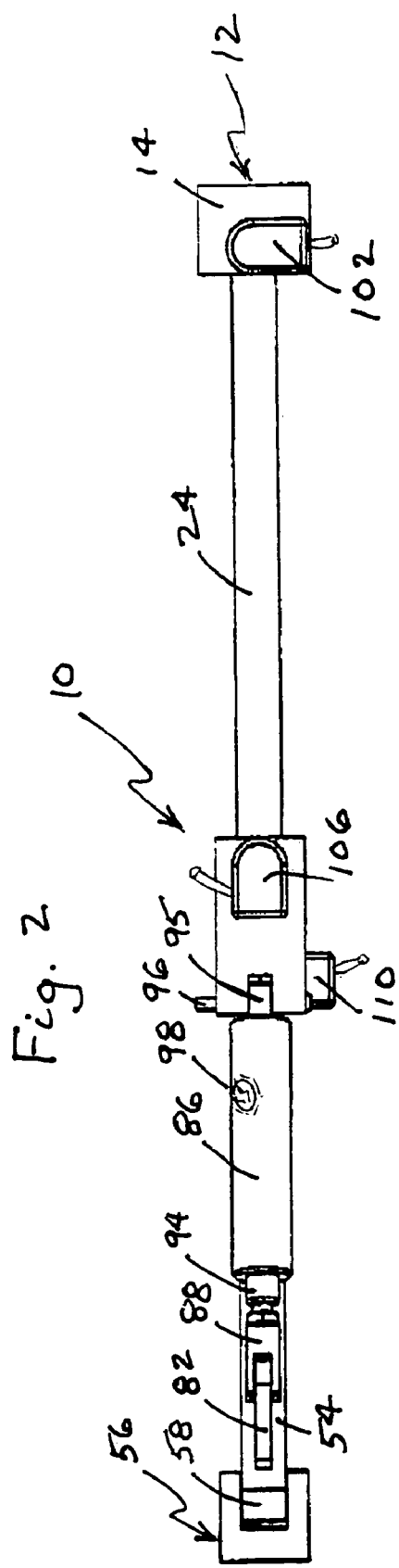
FIG. 2 is a top elevational view of said apparatus.
Figure 3:
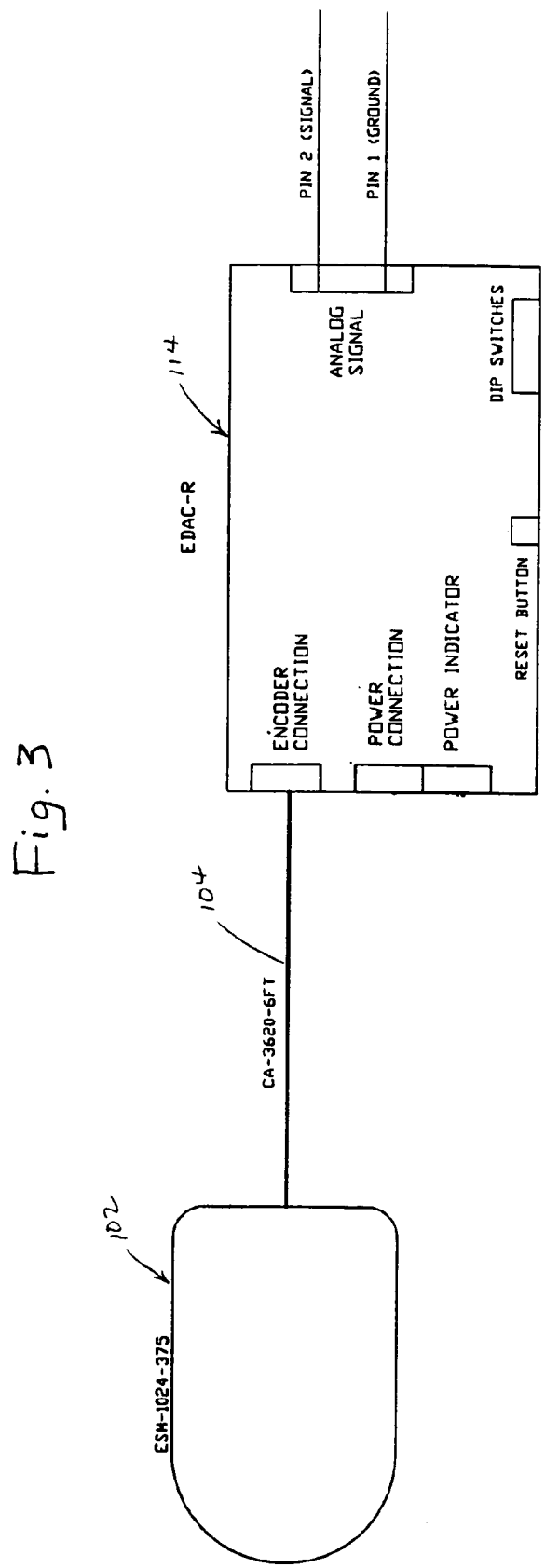
FIG. 3 is a diagram of an electronic control system for an optical encoder device in said apparatus.

Apparatus 10, as shown in FIGS. 1 & 2, is a power hand-tool support apparatus adapted to support the power driven hand-tool at distal end 11 and allow an operator to move the hand-tool to a multiplicity of chosen locations in a three-dimensional space, the hand-tool being capable of transmitting a torque-induced rotation to the operator when the hand-tool is used at the chosen locations. Apparatus 10, being in the main an articulated arm constructed of case aluminum unless otherwise noted, is structurally attached at proximal end 13 to an external support such as wall, workbench, or work site frame with common fasteners through holes 16 extending horizontally through vertical base plate 14 of U-shaped pivot block 12. Aligned hidden holes extend vertically through upper horizontal flange 18 and lower horizontal flange 20, both flanges being integral to and extend outwardly from base plate 14 of block 12. First swing arm section 24 swings freely horizontally and is connected to block 12 by pivot shaft 22 secured by hidden press fit bushings at both ends and engaged through said hidden holes and a vertical hole that extends through proximal end 26 of section 24 from proximal top edge 30 through section 24 to proximal lower edge 32. Distal end 34 of section 24 swings freely horizontally and is connected to the balance of the articulated arm by vertically aligned pivot shaft 36 which and extends through a vertically aligned hidden hole through distal end 34 opening outwardly through distal top edge 30' and distal lower edge 32' of section 24. The prime (') and double prime (") designations on an identifying number indicates that area or part is similar to a previously designated and identified area or part or merely a different point of the same part area. Vertically aligned shaft 36 is secured by hidden press fit bushings at both ends to pivot connector block 40 by engaging its ends through a hidden hole extending vertically through horizontal lower flange 42 and a second vertically aligned hidden hole extending vertically through horizontal upper flange 44, both flanges being integral with and extending proximally from body 48 of block 40. Vertical slot 50 opens distally from top to bottom of body 48 to receive proximal end 60 of lower second arm section 52 and proximal end 64 of upper second arm section 54, both arm sections swinging freely vertically in the connection. Ends 60 and 64 have hidden horizontal holes which receive lower pivot shaft 74 and a hidden upper pivot shaft respectively, the shafts being secured to body 48 by lower press fit bushing 76 and a hidden upper press fit bushing and by extending through a hidden lower hole and a hidden median hole, respectively, these hidden holes extending horizontally from side to side through body 48 and opening through slot 50. The lower hole and its connection with end 60 is located proximate a lower edge of body 48 and the median hole and connection with end 64 is located at a median position vertically along body 48. Vertical slot 58 opens proximally from top to bottom of the body of distal end tooling connection block 56 to receive distal end 62 of lower second arm section 52 and distal end 66 of upper second arm section 54, both arm sections swinging freely vertically in the connection to block 56. Ends 62 and 66 have hidden horizontal holes which receive lower pivot shaft 78 and upper pivot shaft 78' respectively, the shafts being secured to block 56 by lower press fit bushing 80 and upper press fit bushing 80' and by extending through a hidden lower hole and a hidden upper hole, respectively, these hidden holes extending horizontally from side to side through block 56 and opening through slot 58. The said lower hidden hole and its connection with end 62 is located proximate a lower edge of block 56 and the said upper hole and its connection with end 66 is located at an upper edge of block 56. The vertical distances between holes the upper and lower hidden holes on connection blocks 40 and 56 are equal to maintain arm sections 52 and 54 in a parallelogram relationship as they swing vertically to maintain block 56 and any tool attached thereto in a vertical alignment relative to pivot block 12. A plurality of threaded horizontal holes extends from distal end 11 into block 56 to provide secure attachment means of a standard tool holding device. Vertical flange 82 is integral with and extends upwardly from upper edge 84 of end 66 with a hidden horizontal hole extending through the flange to receive clevis pin 92 that rotates freely in said hole. Pin 92 extends into hole 90 through clevis member 88 of pneumatic cylinder 86 connecting pneumatic piston extension member 94 to the distal end of the second section of the articulated arm. A hidden horizontal hole is cut from side to side of body 48 opening through slot 50 proximate an upper distal corner to receive clevis pin 96 which engages a hidden hole in pneumatic piston cylinder member 95 for a freely swinging connection. Nipple 98 provides access connection from cylinder 86 to a pneumatic fluid source. Optical encoder device 102 is mounted on the top surface of flange 18 with the optical scanner connected to the top end of shaft 22 to measure the radial angle position of section 24 in a horizontal plane. Optical encoder device 106 is mounted on the top surface of horizontally swinging flange 44 to measure the radial angle position of the flange in a horizontal plane providing an optical direction to fix the x-y horizontal position of distal end 11 and thus the hand-tool. Optical encoder device 110 is mounted on the side surface of body 48 with the optical scanner connected to the end of upper pivot shaft 74' to measure the radial angle position of section 54 in a vertical plane providing an optical direction to fix the z-axis vertical position of distal end 11 and thus the hand-tool. The optical encoder devices are each part number ESM-1024-375 from US Digital Corporation of Vancouver, Washington, USA, connected through cables 104, 108, and 112, respectively, to separate digital-to analog converter modules, the cables being part number CA-3620-6FT. Encoder 102 is connected through cable 104 to digital to analog converter module 114, which is part number EDAC-R also from US Digital Corporation, and thence to a computer, a dedicated control board, or an industrial programmable logic controller, all state of the art systems, as shown in the diagram of FIG. 3. Encoders 106 and 110 are each connected in the same fashion as shown on FIG. 3. The switch number designations on module 114 are (1) quad multiplier-on, (2) UP count direction-off, (3) index-no reset, and (4) analog-0-10V on. The encoder pinout is 1-ground, 2-index, 3-A channel, 4-+5 VDC power, and 5-B channel. The analog pinout is 1-ground and 2-output voltage. It is well within ordinary skill in the art with said systems to be capable of receiving said digital signals from said converter modules and processing the signals through a conventional analog program to compute the angular position of each encoder relative to a predefined datum, or start point, thereby establishing a position in the work_space.

Tool holder mounting devices 79 and 82 are shown in FIGS. 4 and 5. Vertical connection plate 85 of V-block mount 79 is fastened through holes to block 56 at distal end 56 holding fixed V-block 87 horizontally. Free V-block 89 is attached by fasteners through holes 93 into block 87 forming diamond shaped hole 91 The hand tool is positioned in hole 91 and block 89 is tightened to secure the tool in hole 91 Split-ring mount 81 is attached through plate 85' positioning fixed split-ring block 105 horizontally. The hand-tool base is inserted in circular hole 97 and the distal end of the block is pulled to close vertical slot 99 which extends horizontally from one edge through the block, through hole 97 and into the block on the other side of the hole toward but not to the opposite edge of the block from a distal edge at right angles to slot 99 to secure the tool in the mount.

Apparatus 142, as shown in FIGS. 9, 10, and 8, is a power hand-tool support apparatus similar to apparatus 10 and 120 adapted to support the power driven hand-tool at distal end 11" with improved resistance to transmitting a torque-induced rotation to the operator. Pivot block 12" and the connection of proximal end section 144 of the first section of this apparatus is identical to those of apparatus 10. The first section of the rod is constructed of vertically aligned horizontal parallel telescoping rods 146 and 148 with the proximal ends rigidly attached to end section 144 and the distal ends rigidly attached to housing section 126' open at the bottom to receive a pair of vertically aligned parallel telescoping rods 128' that constitute a third section of the articulated rod. The third section is essentially identical to that of apparatus 120 and FIG. 8 shows that view with prime designations added to the numbers. The movement axes of the arm are designated with axis line 136' and with arrows 138' and 140'.

Positional feedback devices are preferably commercially available optical encoder devices that provide a digital signal of a radial angle position. However for other arm constructions other satisfactory positional feedback devices include commercially available string pot transducers, resolvers that count pulses on a disc, scaled voltage devices, such as linear vector transducers, known as LVDT, and like performing devices. String pot transducers, for example, may be used in the devices shown in FIGS. 7 through 10 positioned between telescoping rods 128 or 128' with the string extending from the pot on the section 122 down to and connected to platform 130. Likewise a hydraulic cylinder to assist lifting vertically may be positioned vertically between rods 128 or 128' with the ends connected between the lower surface of section 122 platform 130 with an LVDT incorporated in the hydraulic cylinder to measure and signal the vertical position of the hand-tool.

While this invention has been described with reference to specific embodiments disclosed herein, it is not confined to the details set forth and the patent is intended to include modifications and changes that may come within and extend from the following claims.

We claim:

1. A power hand-tool support apparatus adapted to support a manually operated power hand-tool and allow an operator to move the hand-tool to a multiplicity of chosen locations in a three-dimensional space, the apparatus comprising:
    (A) a multi-component articulating arm, comprising a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space, and
    (B) at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool,
    wherein the three positional feedback means are adapted to be connected to an electrical controlling means to receive the angular positions of the positional feedback means and correlate the positions, and wherein at least one of the three positional feedback means is an optical encoder to digitally measure a position of a component of the arm.

2. The apparatus of claim 1 wherein there are three positional feedback means and all of said means are optical encoders.

3. The apparatus of claim 1 wherein the feedback means are adapted to be connected to an electrical controlling means that further comprises an apparatus chosen from the group consisting of a computer, a dedicated control board, and an industrial programmable logic controller and said controlling means is capable of receiving signals from said positional feedback means and processing the signals through a conventional program to compute the angular position of each positional feedback means relative to a predefined datum, or start point, thereby establishing a position in the space.

4. The apparatus of claim 3 whereas each of the positional feedback means are further adapted to be electrically connected to separate digital-to-analog converter modules for signal conversion to a scaled voltage, said voltage signal then communicated to said controlling means.

5. The apparatus of claim 1 wherein the feedback means are adapted to be connected to electrical controlling means that further comprises means to electrically and pneumatically control the distal end of the arm, said control being established by means of a user-defined set of programmable parameters, and display means to graphically instruct the user for tool setup and in-process parameters feedback during tool use.

6. The apparatus of claim 1 wherein the apparatus further comprises latching means to electrically lock the tool upon receiving a signal from the controlling means that the position of the hand-tool is in an incorrect position in the space.

7. The apparatus of claim 1 wherein the distal end is adapted to be detachably attached to a power hand-tool capable of transmitting a torque-induced rotation to the operator and the arm further comprises a first guiding means allowing a proximal section of the arm to articulate only in a single first direction, a second guiding means allowing a second section of the arm coupled to the proximal section to articulate only in a single second direction normal with first direction, and a third guiding means allowing the distal end of the arm to articulate only in a single third direction at an angle with a plane or the first and second directions.

8. The apparatus of claim 7 wherein the third guiding means comprises a plurality of rotateably mounted support members in a vertically disposed parallelogram alignment allowing the distal end of the arm to articulate only in a vertical direction.

9. The apparatus of claim 1 further comprising a weight countering means to counter the weight of the arm and hand-tool, the means comprising a pneumatic cylinder comprising clevis ends connected to proximal and distal ends of a section of the arm moving in a vertical direction, whereas the pneumatic cylinder is adapted to be fluid connectable to a pressurized fluid source.

10. The apparatus of claim 1 further comprising a tool mounting device comprising a primary V-block member rigidly attached to the distal end of the arm, a detachable opposing V-block, and clamping means comprising threaded fasteners to attach the detachable V-block to the primary V-block and exert clamping pressure on the detachable V-block adapted to retain a hand-tool between the V-blocks.

11. The apparatus of claim 1 wherein said arm comprises a first arm section comprising a proximal end rotateably connected to a mounting means adapted to be connectable to the external support and distal end to which is rotateably connected to a proximal end of a second arm section comprising a distal end attached to connection means connecting to a tool mounting means to detachably hold the hand-tool.

12. The apparatus of claim 1 wherein the controlling means further comprises an apparatus chosen from the group consisting of a computer, a dedicated control board, and an industrial programmable logic controller and said apparatus is capable of receiving said signals from said converter modules and processing the signals through a conventional program to compute the angular position of each three positional feedback means relative to a predefined datum, or start point, thereby establishing a position in the space.

13. The apparatus of claim 1 wherein the controlling means further comprises means to electrically and pneumatically control the distal end of the arm, said control being established by means of a user-defined set of programmable parameters, and display means to graphically instruct the user for tool setup and in-process parameters feedback during tool use.

14. A power hand-tool support apparatus adapted to support a manually operated power hand-tool and allow an operator to move the hand-tool to a multiplicity of chosen locations in a three-dimensional space, the apparatus comprising:

(A) a multi-component articulating arm, comprising a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space, wherein the power hand-tool is capable of transmitting a torque-induced rotation to the operator and the arm further comprises a first guiding means allowing a proximal section of the arm to articulate only in a single first direction, a second guiding means allowing a second section of the arm coupled to the proximal section to articulate only in a single second direction normal with first direction, and a third guiding means allowing the distal end of the arm to articulate only in a single third direction at an angle with a plane or the first and second directions, (B) at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool, and (C) latching means to electrically lock the tool upon receiving a signal from the controlling means that the position of the hand-tool is in an incorrect position in the space, wherein at least one of the three positional feedback means is an optical encoder to digitally measure a position of a section of the arm, and wherein the positional feedback means are adapted to be connected to an electrical controlling means to receive the angular positions of the encoder means and record the positions.

15. The apparatus of claim 14 further comprising a weight countering means to counter the weight of the arm and hand-tool, the means comprising a pneumatic cylinder comprising clevis ends connected to proximal and distal ends of a section of the arm moving in a vertical direction, whereas the pneumatic cylinder is adapted to be fluid connectable to a pressurized fluid source.

16. The apparatus of claim 14 wherein the third guiding means comprises a plurality of rotateably mounted support members in a vertically disposed parallelogram alignment allowing the distal end of the arm to articulate only in a vertical direction.

17. The apparatus of claim 14 wherein the arm further comprises at least one linear telescoping guide rod section that does not protrude behind a proximal end of the section when fully retracted and maintain the distal end in linear orientation throughout its movement.

18. The apparatus of claim 14 wherein the third section of the arm comprises a pair of the linear telescoping guide rods rigidly attached at the distal end of the second section of the arm in a vertically aligned parallelogram arrangement to maintain the distal end of the arm in a vertical orientation throughout movement in a vertical axis.

19. The apparatus of claim 14 whereas each of the positional feedback means are further adapted to be electrically connected to separate digital-to-analog converter modules for signal conversion to a scaled voltage, said voltage signal then communicated to said controlling means.

20. A power hand-tool support apparatus adapted to support a manually operated power hand-tool that is capable of transmitting a torque-induced rotation to the operator, the apparatus comprising a multi-component articulating arm capable of allowing the operator to move the hand-tool to the locations in a work space, the arm comprising:
(A) a length with a proximal end adapted to be structurally attached to an external support and a distal end adapted to be detachably attached to the hand-tool,
(B) at least one linear telescoping guide rod section that does not protrude behind a proximal end of the section when fully retracted and maintain the distal end in linear orientation throughout its movement, and
(C) a third section of the arm comprising a pair of the linear telescoping guide rods rigidly attached at a distal end of a second section of the arm, the rods in a vertically aligned parallelogram arrangement to maintain a distal end of the arm in a vertical orientation throughout movement in a vertical axis.

21. The apparatus of claim 20 further comprising a weight countering means to vertically counter the weight of the arm and the hand-tool, the means comprising a pneumatic cylinder comprising clevis ends connected to proximal and distal ends of the third section of the arm moving in a vertical plane, whereas the pneumatic cylinder is adapted to be fluid connectable to a pressurized fluid source.

22. The apparatus of claim 20 wherein the arm further comprises a first guiding means allowing the arm to articulate only in a single first direction and the second guiding means allowing the arm to articulate only in a single second direction in a plane with first direction.

23. A power hand-tool support apparatus adapted to support a manually operated power hand-tool that is capable of transmitting a torque-induced rotation to the operator, the apparatus comprising:
a multi-component articulating arm capable of allowing the operator to move the hand-tool to the locations in a work space, the arm comprising:
(i) a length with a proximal end adapted to be structurally attached to an external support and a distal end adapted to be detachably attached to the hand-tool, and
(ii) a first guiding means proximate the proximal end connecting to and allowing a first section of the arm to move only in a horizontal arc, a second guiding means connecting a proximal end of a second section of the arm to a distal end of the first section of the arm and allowing the second section of the arm to move only in a second horizontal arc relative to the distal end of the first section and in a plane with the first horizontal arc, and a third guiding means allowing the distal end of the arm to move only in a vertical line relative to a distal end of the second section,
wherein arm further comprises a distal end section of the arm comprising a pair of the linear telescoping guide rods rigidly attached at a distal end of the second section of the arm, the rods in a vertically aligned parallelogram arrangement to maintain a distal end of the arm in a vertical orientation throughout movement in a vertical axis.

24. The apparatus of claim 23 wherein the third section comprises at least one linear telescoping guide rod section that does not protrude behind a proximal end of the section when fully retracted and maintain the distal end in linear orientation throughout its movement.

25. A power hand-tool support apparatus adapted to support a manually operated power hand-tool that is capable of transmitting a torque-induced rotation to the operator, the apparatus comprising:
a multi-component articulating arm capable of allowing the operator to move the hand-tool to the locations in a work space, the arm comprising:
(i) a length with a proximal end adapted to be structurally attached to an external support and a distal end adapted to be detachably attached to the hand-tool,
(ii) a first guiding means proximate the proximal end of the arm connecting to a proximal end of a horizontally disposed first section of the arm and allowing the first section to move only in a horizontal arc, a second guiding means integral with the first section of the arm allowing a distal end of the first section of the arm to move only in a straight line normal to the proximal end of the first section and in a plane with the horizontal arc, a vertically disposed second section of the arm comprising a proximal end rigidly connected to the distal end to the first section and a free end being the distal end of the arm, and a third guiding means integral with the second section of the arm allowing the distal end of the arm to move only in a vertical line, and
(iii) latching means to electrically lock the tool upon receiving a signal from the controlling means that the position of the hand-tool is in an incorrect position in the space.

26. The apparatus of claim 25 wherein the third section comprises at least one linear telescoping guide rod section that does not protrude behind a proximal end of the section when fully retracted and maintain the distal end in linear orientation throughout its movement.

27. A power hand-tool support apparatus adapted to support a manually operated power hand-tool and allow an operator to move the hand-tool to a multiplicity of chosen locations in a three-dimensional space, the apparatus comprising:
(A) a multi-component articulating arm, comprising a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space, (B) at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool, and (C) means to pneumatically control the distal end of the arm, wherein the three positional feedback means are adapted to be connected to an electrical controlling means to receive the angular positions of the positional feedback means and correlate the positions, and to be established by means of a user-defined set of programmable parameters, and display means to graphically instruct the user for tool setup and in-process parameters feedback during tool use.

28. The apparatus of claim 27 wherein the apparatus further comprises latching means to electrically lock the tool upon receiving a signal from the controlling means that the position of the hand-tool is in an incorrect position in the space.

29. The apparatus of claim 27 wherein a third section of the arm comprises a pair of the linear telescoping guide rods rigidly attached at a distal end of a second section of the arm, the rods in a vertically aligned parallelogram arrangement to maintain a distal end of the arm in a vertical orientation throughout movement in a vertical axis.

30. A power hand-tool support apparatus adapted to support a manually operated power hand-tool and allow an operator to move the hand-tool to a multiplicity of chosen locations in a three-dimensional space, the apparatus comprising:

(A) a multi-component articulating arm, comprising a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space, (B) at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool, and (C) latching means to electrically lock the tool upon receiving a signal from the controlling means that the position of the hand-tool is in an incorrect position in the space, wherein the three positional feedback means are adapted to be connected to an electrical controlling means to receive the angular positions of the positional feedback means and correlate the positions.

31. The apparatus of claim 30 wherein the distal end of the arm comprises a pair of the linear telescoping guide rods rigidly attached at a distal end of the second section of the arm, the rods in a vertically aligned parallelogram arrangement to maintain a distal end of the arm in a vertical orientation throughout movement in a vertical axis.

32. A power hand-tool support apparatus adapted to support a manually operated power hand-tool and allow an operator to move the hand-tool to a multiplicity of chosen locations in a three-dimensional space, the apparatus comprising:

(A) a multi-component articulating arm, comprising a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space, (B) at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool, and (C) a weight countering means to counter the weight of the arm and hand-tool, the means comprising a pneumatic cylinder comprising clevis ends connected to proximal and distal ends of a section of the arm moving in a vertical direction, whereas the pneumatic cylinder is adapted to be fluid connectable to a pressurized fluid source, wherein the three positional feedback means are adapted to be connected to an electrical controlling means to receive the angular positions of the positional feedback means and correlate the positions.

33. The apparatus of claim 32 further comprising pressure adjustment means in the pneumatic cylinder allowing adjustment of the pressure in the cylinder to compensate for varying tool weights and operator preference.

34. A power hand-tool support apparatus adapted to support a manually operated power hand-tool capable of transmitting a torque-induced rotation to the operator and allow an operator to move the hand-tool to a multiplicity of chosen locations in a three-dimensional space, the apparatus comprising:

(A) a multi-component articulating arm, comprising a length with a proximal end adapted to be structurally attached to an external support, a distal end adapted to be detachably attached to the hand-tool, and a plurality of sections, each section capable of moving in a separate direction relative to an other section, wherein the arm is capable of allowing the operator to move the hand-tool to any of the chosen locations in the space and further comprising a first guiding means allowing a proximal section of the arm to articulate only in a single first direction, a second guiding means allowing a second section of the arm coupled to the proximal section to articulate only in a single second direction normal with first direction, and a third guiding means allowing the distal end of the arm to articulate only in a single third direction at an angle with a plane or the first and second directions, and (B) at least three positional feedback means, each capable of communicating a position of the positional feedback means, the positional feedback means being located at separated positions along the length of the arm, each position chosen to allow measurement of a position of a section of the arm relative to another section of the arm, such that a combination of the positions defines a selectable datum position of the hand-tool, wherein the three positional feedback means are adapted to be connected to an electrical controlling means to receive the angular positions of the positional feedback means and correlate the positions.

35. The apparatus of claim 34 wherein at least one of the three positional feedback means is an optical encoder to digitally measure a position of a component of the arm.

36. The apparatus of claim 34 wherein there are three positional feedback means and each of said means are positioned along the arm to measure a position of each of the three sections.

37. The apparatus of claim 34 wherein the arm comprises at least one linear telescoping guide rod section that does not protrude behind a proximal end of the section when fully retracted and maintain the distal end in linear orientation throughout its movement.

38. The apparatus of claim 34 wherein the third section of the arm comprises a pair of the linear telescoping guide rods rigidly attached at the distal end of the second section of the arm in a vertically aligned parallelogram arrangement to maintain the distal end of the arm in a vertical orientation throughout movement in a vertical axis.

39. The apparatus of claim 34 further comprising a weight countering means to counter the weight of the arm and the hand-tool, the means comprising a pneumatic cylinder comprising clevis ends connected to proximal and distal ends of a section of the arm moving in a vertical plane, whereas the pneumatic cylinder is adapted to be fluid connectable to a pressurized fluid source.

* * * * *